July 13, 1954     W. BADER     2,683,302
TOOLHOLDER
Filed Dec. 6, 1951
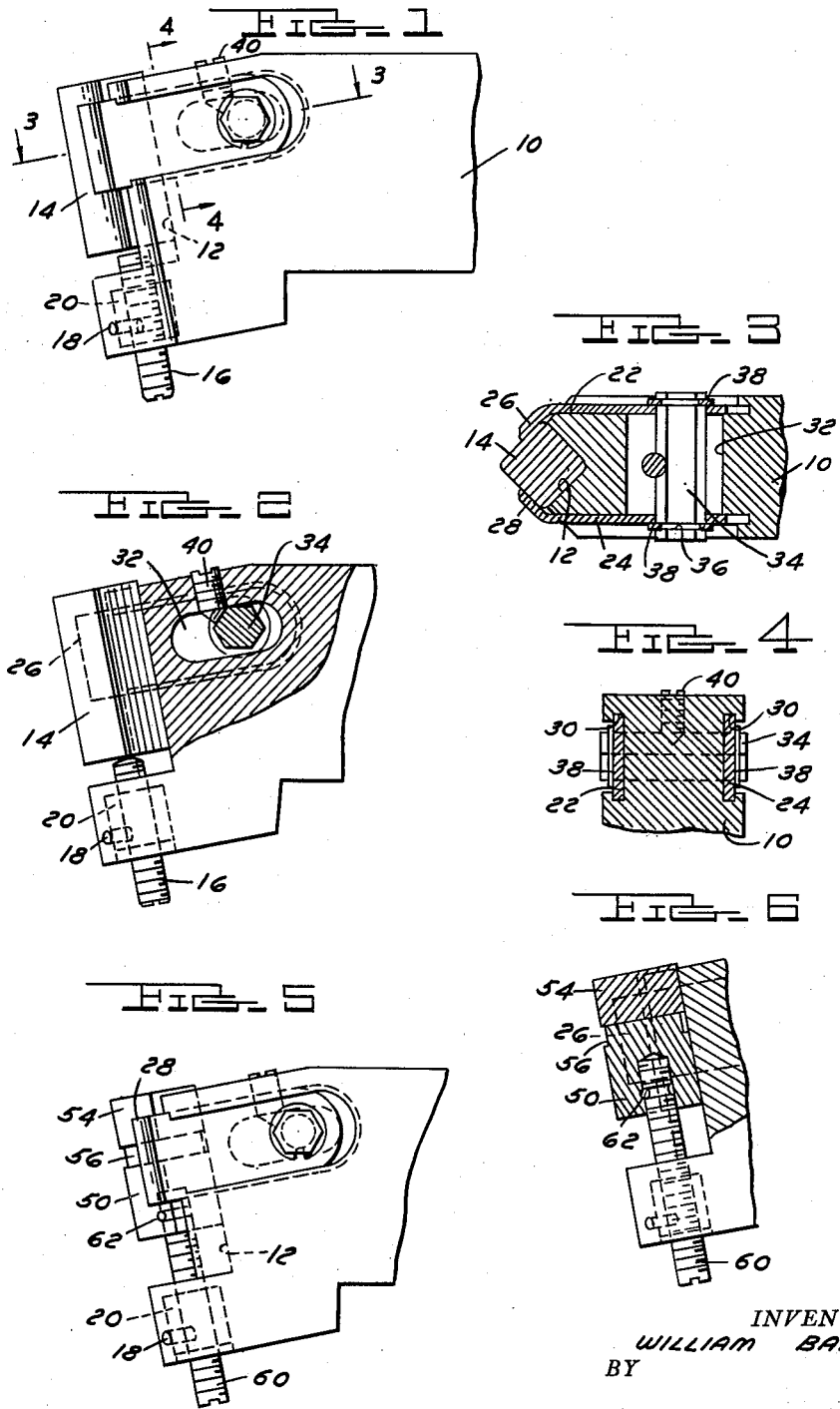
INVENTOR.
WILLIAM BADER
BY
Barney, Kissel, Laughlin & Raisch
ATTORNEYS Patented July 13, 1954

2,683,302

UNITED STATES PATENT OFFICE 2,683,302

TOOLHOLDER

William Bader, Birmingham, Mich., assignor to Wesson Multicut Company, Ferndale, Mich., a corporation of Michigan Application December 6, 1951, Serial No. 260,174

13 Claims. (Cl. 29—96)

1

This invention relates to a cutting tool and more particularly to that type of tool in which a tool holder has clamped therein a tungsten carbide insert or cutter bit having cutting edges or corners projecting in a position properly related to the cutter body.

It is well known that tungsten carbide inserts are extremely expensive. It has been the custom for many years to braze these inserts onto a piece of steel to provide a cutter bit which may be inserted in various tool bodies.

In a later development the tungsten carbide inserts are actually introduced individually into tool bodies and held there by a clamping means. An example of this is shown in my co-pending application Serial No. 176,733, filed July 29, 1950.

One of the problems in connection with this type of tool has been the using up of these bits or inserts after they have been ground sufficiently often to become rather short. In most cases it has been impossible to use a carbide insert for normal cutting operations when it becomes much shorter than five-eighths of an inch.

In some cases attempts have been made to salvage these short ends by brazing them with pieces of steel and inserting them until they are further used up. This, however, is an expensive operation and it has not been too satisfactory.

The present invention relates to a tool holder which can be used for short pieces of carbide insert bits to as low as three-eighths or one-fourth of an inch. After the inserts are used to this extent they may then be discarded economically since the amount of money required to salvage them further would be greater than the value received.

Briefly, the invention consists in a special clamping means which may be used for standard sized bits up to the point where they become too short to use alone and which will also receive backing members of identical cross section to the bit in end-to-end relation with short carbide inserts. The clamping means holds equally well on the combined insert and backing members, permitting the insert to be used up to a very short piece.

Other objects and features of the invention relating to details of construction and operation will be apparent in the following description and claims.

Drawings accompany the disclosure, and the various views thereof are as follows:

Figure 1, a side elevation of an assembled tool showing a standard bit in position.

Figure 2, a longitudinal vertical section of the tool as shown in Figure 1.

2

Figure 3, a sectional view on line 3—3 of Figure 1.

Figure 4, a sectional view on line 4—4 of Figure 1.

Figure 5, a view of the tool similar to Figure 1, showing the use of an insert backing member together with the insert.

Figure 6, a longitudinal vertical section of the tool shown in Figure 5.

Referring to the drawings, in Figure 1 a tool body 10 has an open-sided recess 12 formed at the top forward portion thereof; and for purposes of example, this recess is intended to receive a bit 14 with a square cross section as shown in Figure 3.

This invention is equally applicable to bits of triangular cross section, circular cross section, or any other irregular cross section. Below the bit recess 12 is a backing screw 16 threaded in an extension of the tool body 10. A small lock set screw 18 serves to lock screw 16 in its adjusted position.

In most cases, in order to permit broaching of the recess 14 it is desirable to mount the screw 16 in a threaded insert 20. The set screw 18 then locks the insert in place and may serve also as a lock screw for the backing screw 16.

The clamping members for the insert 14 consist of finger plates 22 and 24 having ends 26 and 28 adapted to lie at the same angle as the outer sides of the bit or insert 14. The plates 22 and 24 are slidable in re-entrant grooves 30 formed in the sides of the body 10 (Figure 4). These plates, preferably from $\frac{1}{16}$ to $\frac{3}{32}$ of an inch in thickness, are formed of spring steel.

Tranversely of the head of the tool is formed a passage 32, through which extends a hexagonal pin 34. This pin has adjacent each end a groove 36 formed therein, and after the pin is inserted through the two plates 22 and 24, lock rings 38 are snapped into the grooves 36 to hold the parts assembled.

As shown in Figure 2 a conically ended set screw 40 co-operates with one of the sides of the pin 34 and can force the pin back in the opening 32 to exert also a clamping force on the plates 22 and 24.

The manner of the clamping of the insert 14 will be obvious then. The insert is placed between the finger portions 26 and 28 and the screw 40 moved inward to draw back on the hex pin.

In Figures 5 and 6 an adapter unit is shown which permits the use of short tungsten carbide inserts. This adapter unit consists of a backing member 50 which has a cross section identical with that of the bit 14 and the small portion 54 of the bit shown in Figure 5.

The end 56 of the backing member is reduced in cross section for a reason that will be later brought out. The screw 16 is removed from the tool, and the backing member is controlled by a screw 60 which is rotatably associated with the base of the backing member by a groove formed in the screw and the small pin 62 which passes into the groove through the backing member. This rotatable association between the screw 60 and backing block 50 can be accomplished by other mechanical devices.

It will be seen that by reason of the fact that the backing block 50 is positioned in the recess 12 the clamping plates or fingers 26 and 28 can pull equally on both the block 50 and the insert 54.

Due to the fact that the projections 26 and 28 are formed of hardened, slightly resilient material, and due to the fact that there is a reduced cross section 56 between the two blocks of material, there is an equalization of pressure which results in a steady clamping action on both members which pulls them securely into the recess formed in the tool body.

With this arrangement, a tungsten carbide unit may be used up almost completely before being discarded and the same tool can be used for the entire operation. When the carbide bit or insert becomes too short to use, the regular backing screw 16 and the backing block 50 together with the screw 60 can be inserted in the tool for the remainder of the use of the particular bit.

In addition, the fact that the clamping devices leave the forward edge of the tool completely free reduces the danger of chip wash wear on the clamping means and increases the inclination angle clearance for the tool in general. The use of the hexagonal member 34 with the conical screw 40 provides a line contact between these two members which is more stable than a point contact which is obtained with a round pin.

What I claim is:

1. A tool holder comprising a body having an open-sided recess at one end, a cutter insert having walls to conform to those of the recess, and retaining means for said insert to hold it in said recess comprising a pair of finger plates, each having one end to bear against the outside of the insert and the other end of each insert being slidable in the tool body in a recess having a reentrant groove at each side to receive the edges of the plate, and means in said body to exert a simultaneous clamping force on said finger plates to draw the cutter insert firmly against the body.

2. In a tool holder of the type having an open-sided recess at the forward end of a body to receive an elongate cutter, means to clamp said cutter in said recess comprising a pair of hardened, slightly resilient projections embracing the insert at each side of the body, said projections being independently mounted on means having a unilineal sliding relation to said body, and mechanical means to co-operate with said body and said means to exert clamping force on said cutter.

3. Insert clamping means as defined in claim 2 in which the projections are integral parts of rearwardly extending members joined transversely.

4. Insert clamping means as defined in claim 2 in which the projections are integral parts of rearwardly extending members joined transversely and the mechanical means comprises a threaded member movable relative to the body to shift said projections rearwardly.

5. Insert clamping means as defined in claim 2 in which the projections are integral parts of a rearwardly extending member slidable in a confining opening in the body, and the mechanical means comprises a threaded member operably engaged with the rearwardly extending member of each projection and movable relative to the body to shift said projections rearwardly.

6. Insert clamping means as defined in claim 2 in which the projections are integral plates slidable in grooves in the body, a pin transverse of the side plates extending through the body, and means associated with said body to move said pin rearwardly to clamp an insert in the body.

7. A tool holder comprising a shank to be held in a machine, a cutter head on said shank having formed therein a recess transversely of said head at an angle thereto and being open sided through at least a portion of its length, a tool bit having surfaces complemented to the walls of said recess to be received in said recess, a backing member for a tool bit having a cross section identical with that of the tool bit, means mounting the backing member in said recess comprising a screw threaded in a portion of said shank and having an end portion rotatable in a recess in said backing member, and means to hold said bit and said backing member in said recess comprising retaining members extending around portions of said bit and said backing member and having portions extending back toward said cutter head, and mechanical means associated with said head for applying a pressure against said bit and backing member to force the same securely into said recess.

8. A tool holder comprising a shank to be held in a machine, a cutter head on said shank having formed therein a recess transversely of said head at an angle thereto and being open sided through at least a portion of its length, a tool bit having surfaces complemented to the walls of said recess to be received in said recess, a backing member for a tool bit having a cross section identical with that of the tool bit, and means to hold said bit and said backing member in said recess comprising retaining members extending around portions of said bit and said backing member and having portions extending back toward said cutter head, and mechanical means associated with said head for applying a pressure against said bit and backing member to force the same securely into said recess.

9. A tool holder as defined in claim 8 in which the tool bit and the backing member are positioned in the tool in end-to-end relation, and the end of the backing member adjacent the tool bit is reduced in cross section.

10. In a tool holder of the type having an open-sided recess at the forward end of a body to receive a cutter bit, a backing member having a cross section the same as that of the recess and the bit to lie end to end with the bit in the recess, means to position said backing member in said recess longitudinally thereof, and means to clamp said bit and said backing member in said recess comprising a pair of hardened, slightly resilient projections embracing the bit and the backing member at each side of the body, said projections being mounted on means slidable in said body, and mechanical means associated with said body and said means to exert simultaneous but independent clamping force on said bit and said backing member.

11. A combination as defined in claim 10 in which the end of the backing insert adjacent the bit is reduced in cross section from the regular dimensions of the bit and the insert.

12. A tool holder comprising a body having an open-sided recess at one end, a cutter insert having walls to conform to those of the recess, and retaining means for said insert to hold it in said recess comprising a pair of finger plates, each having one end to bear against the outside of the insert and each having another portion slidable on the tool body, means associating said tool body and said other portion in a manner to confine said portion against said body in slidable relation, and means in said body to exert a simultaneous clamping force on said finger plates to draw the cutter insert firmly against the body.

13. In a tool holder of the type having an open-sided recess at the forward end of a body to receive an elongate cutter, means to clamp said cutter in said recess comprising a pair of hardened, slightly resilient projections embracing spaced portions of the insert at each side of the body, means to carry each of said projections mounted independently of each other and having a uni-lineal sliding motion with respect to said body, and mechanical means co-operating with said body and with said sliding means to exert simultaneous but independent clamping action on said projections whereby to draw an elongate cutter firmly against the body.

References Cited in the file of this patent

UNITED STATES PATENTS

| Number | Name | Date |
|---|---|---|
| 2,341,314 | Clark | Feb. 8, 1944 |

FOREIGN PATENTS

| Number | Country | Date |
|---|---|---|
| 13,429 | Great Britain | June 18, 1896 |
| 494,973 | Germany | Mar. 31, 1930 |
| 619,549 | Great Britain | Mar. 10, 1949 |